United States Patent
Kageme

(10) Patent No.: US 10,069,351 B2
(45) Date of Patent: Sep. 4, 2018

(54) ARMATURE AND ROTATING ELECTRICAL DEVICE

(71) Applicant: ASMO CO., LTD., Kosai, Shizuoka-pref. (JP)

(72) Inventor: Shigeaki Kageme, Toyohashi (JP)

(73) Assignee: ASMO CO., LTD., Kosai (JP)

( * ) Notice: Subject to any disclaimer, the term of this patent is extended or adjusted under 35 U.S.C. 154(b) by 49 days.

(21) Appl. No.: 14/537,914

(22) Filed: Nov. 11, 2014

(65) Prior Publication Data
US 2015/0137638 A1    May 21, 2015

(30) Foreign Application Priority Data

Nov. 20, 2013  (JP) .................................. 2013-240159
Sep. 3, 2014  (JP) .................................. 2014-179362

(51) Int. Cl.
*H02K 3/28* (2006.01)
*H02K 3/38* (2006.01)
(Continued)

(52) U.S. Cl.
CPC .............. *H02K 1/148* (2013.01); *H02K 3/522* (2013.01); *H02K 21/22* (2013.01); *H02K 3/28* (2013.01);
(Continued)

(58) Field of Classification Search
CPC .... H02K 1/148; H02K 21/22; H02K 2203/00; H02K 2203/06; H02K 2203/12;
(Continued)

(56) References Cited

U.S. PATENT DOCUMENTS

| 2008/0106161 A1* | 5/2008 | Matsuzaki | ............. | H02K 3/524 |
|---|---|---|---|---|
| | | | | 310/71 |
| 2008/0116755 A1* | 5/2008 | Sahara | ................... | H02K 3/522 |
| | | | | 310/71 |

(Continued)

FOREIGN PATENT DOCUMENTS

| CN | 101895185 A | 11/2010 |
|---|---|---|
| CN | 103248145 A | 8/2013 |

(Continued)

OTHER PUBLICATIONS

English language translation of the following: Office action dated Dec. 21, 2017 from the SIPO in a Chinese patent application No. 201410662696.4 corresponding to the instant patent application. This office action translation is submitted now in order to supplement the understanding of the cited reference(s) being disclosed in the instant Information Disclosure Statement.

(Continued)

*Primary Examiner* — Joshua Benitez Rosario
*Assistant Examiner* — Alexander Moraza
(74) *Attorney, Agent, or Firm* — SOLARIS Intellectual Property Group PLLC

(57) ABSTRACT

There is provided an armature including: an armature core that includes plural tooth portions extending in a radial direction and disposed in a row around a circumferential direction; an insulator including plural insulation portions integrated with the armature core; plural windings each including plural wound portions wound on the tooth portions with the insulation portions interposed between the wound portions and the tooth portions, and a crossing wire connecting the plural wound portions together; wherein at a tooth portion, a terminal portion of a wound portion and a terminal portion of a crossing wire are positioned at side portions of the tooth portion on the same side as each other in the circumferential direction; and the insulator is provided (Continued)

with a retaining section that retains the terminal portion of the wound portion and guides the terminal portion of the crossing wire.

8 Claims, 11 Drawing Sheets

(51) Int. Cl.
*H02K 3/52* (2006.01)
*H02K 3/50* (2006.01)
*H02K 3/18* (2006.01)
*H02K 1/14* (2006.01)
*H02K 21/22* (2006.01)

(52) U.S. Cl.
CPC ................ *H02K 3/38* (2013.01); *H02K 3/50* (2013.01); *H02K 2203/06* (2013.01); *H02K 2203/12* (2013.01)

(58) Field of Classification Search
CPC .. H02K 3/18; H02K 3/28; H02K 3/38; H02K 3/52; H02K 3/522; H02K 3/50; H02K 3/46; H02K 3/48
USPC ........................... 310/71, 208, 198, 195, 179
See application file for complete search history.

(56) References Cited

U.S. PATENT DOCUMENTS

| | | | | |
|---|---|---|---|---|
| 2010/0295394 A1* | 11/2010 | Sahara | ................... | H02K 3/522 310/71 |
| 2013/0187513 A1* | 7/2013 | Hashimoto | ............ | H02K 3/522 310/215 |
| 2013/0200742 A1* | 8/2013 | Seki | .......................... | H02K 3/28 310/195 |
| 2013/0315759 A1* | 11/2013 | Hayakawa | ............... | H02K 3/46 417/420 |

FOREIGN PATENT DOCUMENTS

| | | |
|---|---|---|
| JP | 2005-229703 A | 8/2005 |
| JP | 2006-115565 A | 4/2006 |
| JP | 2006-129623 A | 5/2006 |
| JP | 2010-273450 A | 12/2010 |
| JP | 2013-240259 A | 11/2013 |

OTHER PUBLICATIONS

English language translation of the following: Office action dated Mar. 20, 2018 from the JPO in a Japanese patent application No. 2014-179362 corresponding to the instant patent application. This office action translation is submitted now in order to supplement the understanding of the cited reference(s) being disclosed in the instant Information Disclosure Statement.

* cited by examiner

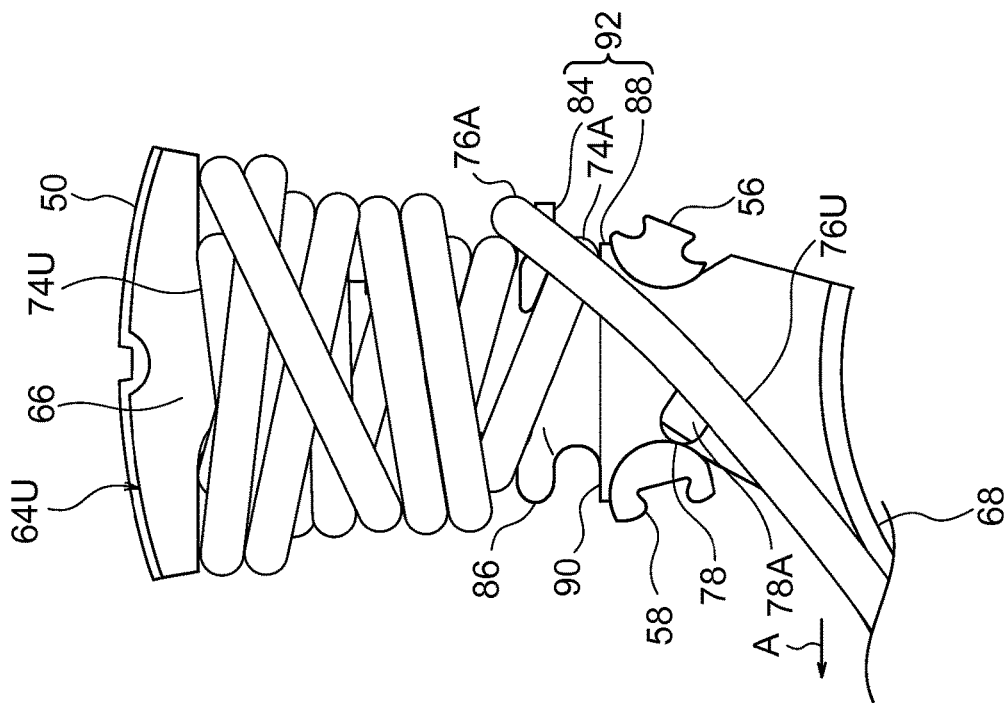
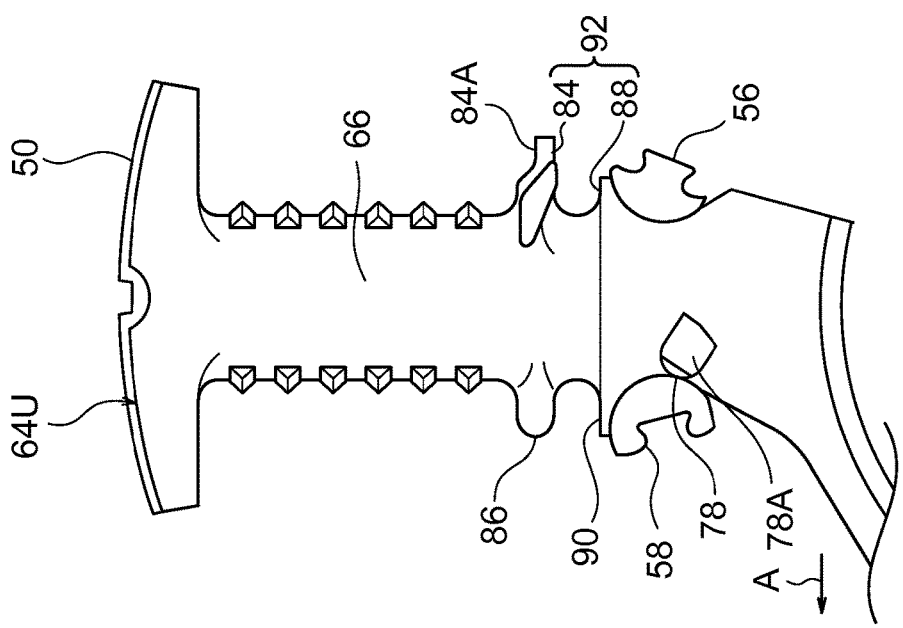

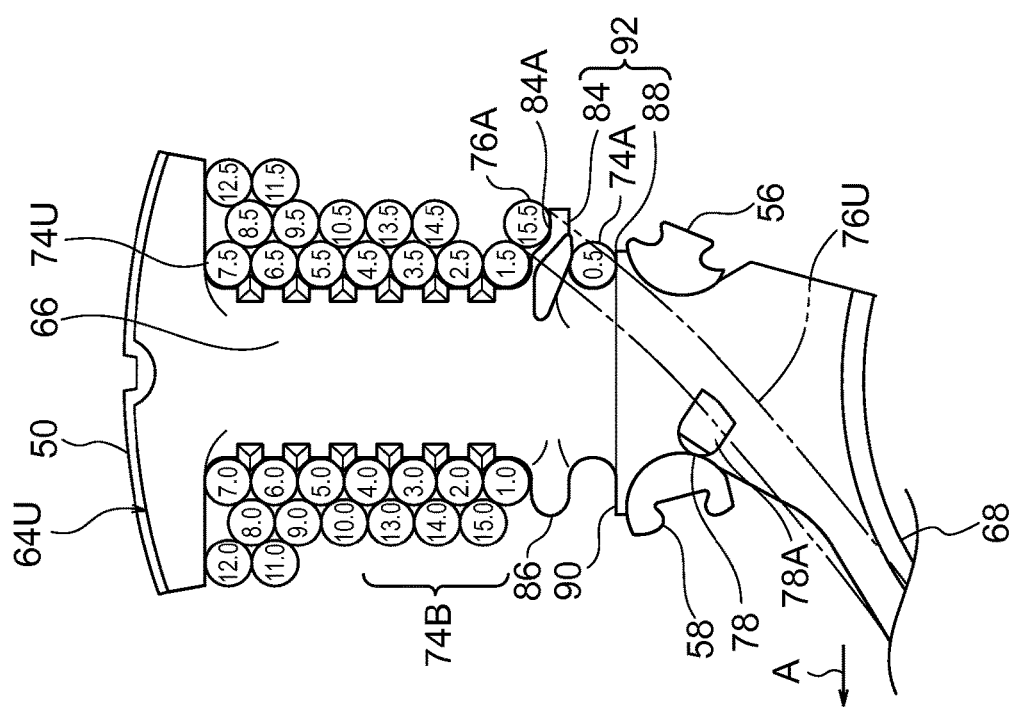

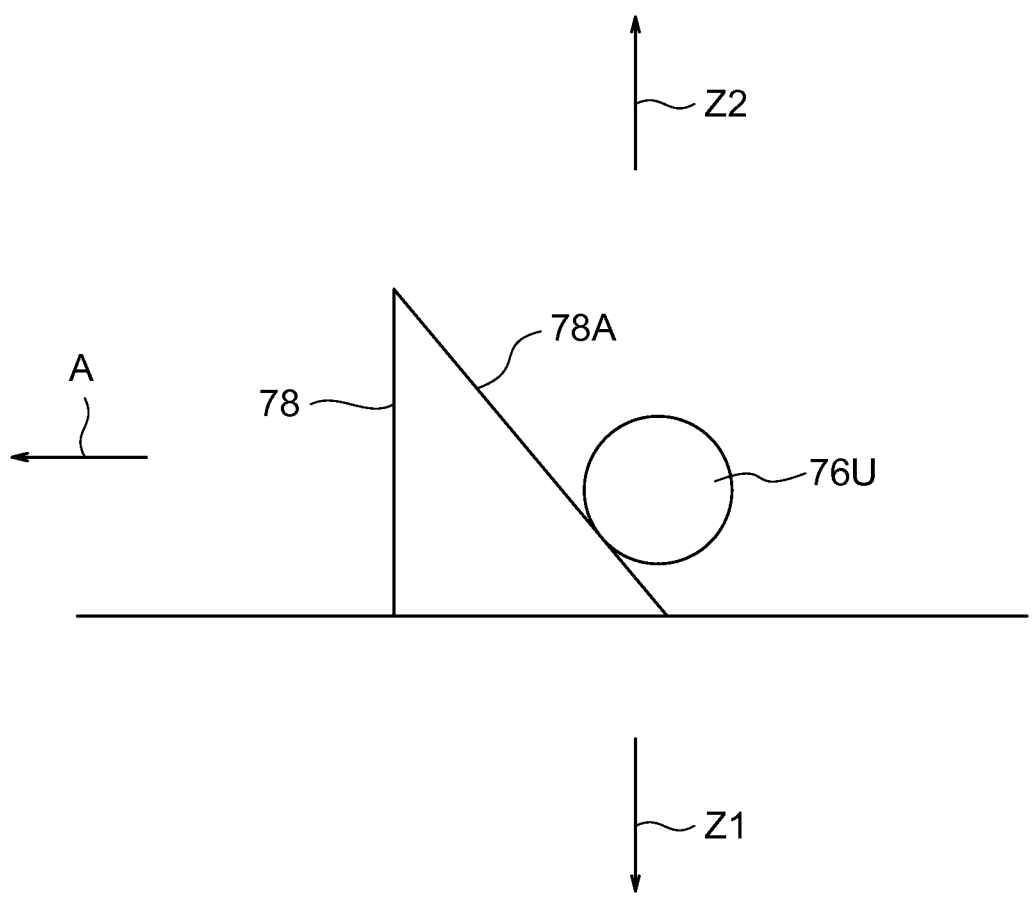

ARMATURE AND ROTATING ELECTRICAL DEVICE

CROSS-REFERENCE TO RELATED APPLICATION

This application claims priority under 35 USC 119 from Japanese Patent Application No. 2013-240159 filed on Nov. 20, 2013, and Japanese Patent Application No. 2014-179362 filed on Sep. 3, 2014, the disclosures of which are incorporated by reference herein.

BACKGROUND

Technical Field

The present invention relates to an armature and a rotating electrical device.

Related Art

The following are known as conventional armatures employing a divided core (see, for example, Japanese Patent Application No. 2012-095871). An armature described in Japanese Patent Application No. 2012-095871 employs an armature core divided into plural core configuration members as a divided core. Plural insulators are employed in the armature, and each of the plural insulators includes plural insulation portions that are attached to the core configuration members, and a coupling portion that couples the plural insulation portions. The armature is provided with plural windings, and each of the plural windings includes plural wound portions that are wound on tooth portions of the core configuration members with the insulation portions interposed therebetween, and a crossing wire that connects the plural wound portions together.

However, in the armature described above, in cases in which the number of turns of the winding at the left and right of the tooth portion is different by 0.5 turns, for example, a terminal portion of the wound portion and a terminal portion of the crossing wire are positioned at side portions at the same side of the tooth portion (side portions at the same side as each other in the circumferential direction on each of the plural tooth portions). When the terminal portion of the wound portion is retained by a snap-fit structure in such cases, the terminal portion of the crossing wire cannot be retained, and the position of the terminal portion of the crossing wire becomes misaligned, causing interference with other portions.

SUMMARY

An object of the embodiments of the present invention, therefore, is to provide an armature that can suppress positional misalignment of a terminal portion of a crossing wire, and can suppress interference of the terminal portion of the crossing wire with other portions, even in cases in which the terminal portion of a wound portion and a terminal portion of the crossing wire are positioned at side portions on the same side of a tooth portion, due to the number of turns of a winding differing by 0.5 turns at the left and right of the tooth portion.

The first aspect of the present invention is an armature including an armature core that includes plural tooth portions extending in a radial direction and disposed in a row around a circumferential direction, an insulator including plural insulation portions integrated with the armature core, plural windings each including plural wound portions wound on the tooth portions with the insulation portions interposed between the wound portions and the tooth portions, and a crossing wire connecting the plural wound portions together. At a tooth portion, a terminal portion of the wound portion and a terminal portion of the crossing wire are positioned at side portions of the tooth portion on the same side as each other in the circumferential direction, and the insulator is provided with a retaining section that retains the terminal portion of the wound portion and guides the terminal portion of the crossing wire.

In the armature according to the first aspect described above, the insulator is provided with the retaining section that retains the terminal portion of the wound portion, and guides the terminal portion of the crossing wire. As a result, even when the terminal portion of the wound portion and the terminal portion of the crossing wire are positioned at side portions on the same side of the tooth portion (side portions on the same side as each other in the circumferential direction on each of the plural tooth portions) due to the number of turns of the winding differing by 0.5 turns at the left and right of the tooth portion, the terminal portion of the crossing wire is guided by the retaining section, that retains the terminal portion of the wound portion, such that positional misalignment of the terminal portion of the crossing wire can be suppressed. Interference of the terminal portion of the crossing wire with other portions can thereby be suppressed.

The second aspect of the present invention is the armature of the first aspect, wherein the retaining section is provided with a retaining projection that guides the terminal portion of the crossing wire, and a supporting portion that retains the terminal portion of the wound portion in cooperation with the retaining projection, the wound portion is supported by a base end portion of the retaining projection, and the terminal portion of the crossing wire is guided by a leading end portion of the retaining projection.

In the armature according to the second aspect described above, the wound portion is supported by the base end portion of the retaining projection, enabling a collapse in the shape of the wound portion to be suppressed. Moreover, the terminal portion of the crossing wire is guided by the leading end portion of the retaining projection, thereby enabling the leading end portion of the retaining projection to be effectively utilized to guide the terminal portion of the crossing wire.

The third aspect of the present invention is the armature of the second aspect, wherein a curved face is formed at the leading end portion of the retaining projection so as to curve along an outer peripheral face of the terminal portion of the crossing wire.

In the armature according to the third aspect described above, the leading end portion of the retaining projection is formed with the curved face curving along the outer peripheral face of the terminal portion of the crossing wire, thereby enabling the terminal portion of the crossing wire to be smoothly guided by the leading end portion of the retaining projection.

The fourth aspect of the present invention is the armature of the second aspect or the third aspect, wherein the terminal portion of the wound portion is positioned further toward a base end portion side of the tooth portion than a terminal portion of the crossing wire, the retaining projection is present between the terminal portion of the wound portion and the terminal portion of the crossing wire, and the retaining section configures a snap-fit structure that clamps the terminal portion of the wound portion using the retaining projection and the supporting portion.

In the armature according to the fourth aspect described above, the retaining section configures the snap-fit structure that clamps the terminal portion of the wound portion using the supporting portion and the retaining projection. The terminal portion of the wound portion can be retained by the snap-fit structure, thereby enabling positional misalignment of the terminal portion of the wound portion to be suppressed.

The fifth aspect of the present invention is the armature of any one of the first aspect to the fourth aspect, wherein the armature core is configured by plural core configuration members divided in the circumferential direction of the armature core, each of the plural core configuration members is provided with an engaged portion and an engaging portion, the plural core configuration members are coupled together in a ring shape by engaging adjacent engaged portions and engaging portions, the insulation portions are provided with a guiding projection, and a portion of the crossing wire on the terminal portion side is positioned between the engaged portion and the engaging portion formed at respective side portions on both sides of the core configuration member by being guided by the guiding projection to the side of a coupling portion that couples the insulation portions.

In the armature according to the fifth aspect described above, the engaging portion and the engaged portion are provided to each of the plural core configuration members, and the plural core configuration members are coupled together in a ring shape by engagement of the adjacent engaging portions and engaged portions. The adjacent engaging portions and engaged portions thereby enable rattling of the plural core configuration members coupled together in a ring shape to be suppressed.

Moreover, the insulating portions of the insulator are provided with the guide projections. A portion of the terminal portion side of the crossing wire is positioned between the engaging portion and the engaged portion formed to side portions on both sides of the core configuration member, by being guided by the guide projection toward the coupling portion side coupling between the insulating portions. Thus the crossing wire can accordingly be suppressed from becoming jammed between the adjacent respective engaging portions and engaged portions, even during engagement of the adjacent engaging portions and engaged portions to couple together the adjacent core configuration members.

The sixth aspect of the present invention is the armature of the fifth aspect, wherein the crossing wire passes further to the inside than an inner radial portion of the plural core configuration members.

In the armature according to the sixth aspect described above, the crossing wires pass further to the inside than inner radial portions of the plural core configuration members. This also enables the crossing wires to be suppressed from becoming jammed between the adjacent engaging portions and engaged portions during coupling of the adjacent core configuration members by the engaging portions.

The seventh aspect of the present invention is the armature of any one of the first aspect to the sixth aspect, wherein the armature further includes plural of the insulators, each of which includes a coupling portion that couples the plural insulation portions together, plural mutually independent armature configuration units that are configured by assembling a pair of the core configuration members to each of the plural insulators, and winding the winding on the tooth portions of the pair of core configuration members, plural armature configuration portions are configured by assembling adjacent armature configuration units from the plural armature configuration units together, wherein in each of the plural armature configuration portions, a pair of the crossing wires is disposed so as to trace each of the pairs of the coupling portions, and one of the coupling portions and one of the crossing wires, and another of the coupling portions and another of the crossing wires, are divided at one side and at the other side of an axial center portion of the armature configuration portions.

In the armature according to the seventh aspect described above, the plural armature configuration units are configured independently of each other by assembling a pair of the core configuration members to each of the plural insulators, and winding the respective winding onto the teeth portions of the pair of core configuration members. The plural armature configuration sections are configured by combining two of the plural armature configuration units that are adjacent to each other. In each of the plural armature configuration sections, the pair of crossing wires are disposed so as to trace each of the pairs of the coupling portions, and one of the coupling portions and one of the crossing wires, and another of the coupling portions and another of the crossing wires, are provided divided at one side and at the other side of an axial center portion of the armature configuration portions. Since the pair of crossing wires do not cross each other in the respective armature configuration sections, an increase in the axial length of the armature can be suppressed, even when the plural armature configuration sections are assembled together to configure the armature. A shorter axial length of the armature is accordingly enabled than when the pairs of crossing wires cross each other in the respective armature configuration sections.

The eighth aspect of the present invention is a rotating electrical device provided with the armature of any one of the first aspect to the seventh aspect.

BRIEF DESCRIPTION OF THE DRAWINGS

Exemplary embodiments of the present invention will be described in detail based on the following figures, wherein:

FIG. 8A is an enlarged view of relevant portions of the armature configuration unit illustrated in FIG. 7, and illustrates a state prior to a winding being wound on;

FIG. 8B is an enlarged plan view of relevant portions of the armature configuration unit illustrated in FIG. 7, and illustrates a state after a winding has been wound on;

FIG. 8C is an enlarged partial cross-section of relevant portions of the armature configuration unit illustrated in FIG. 7, and illustrates a state after a winding has been wound on;

FIG. 9 is a vertical cross-section schematically illustrating the guide projection and peripheral portions thereof illustrated in FIGS. 8A, 8B, and 8C;

DETAILED DESCRIPTION

Explanation follows regarding an exemplary embodiment of the present invention, based on the drawings.

Figure 1:
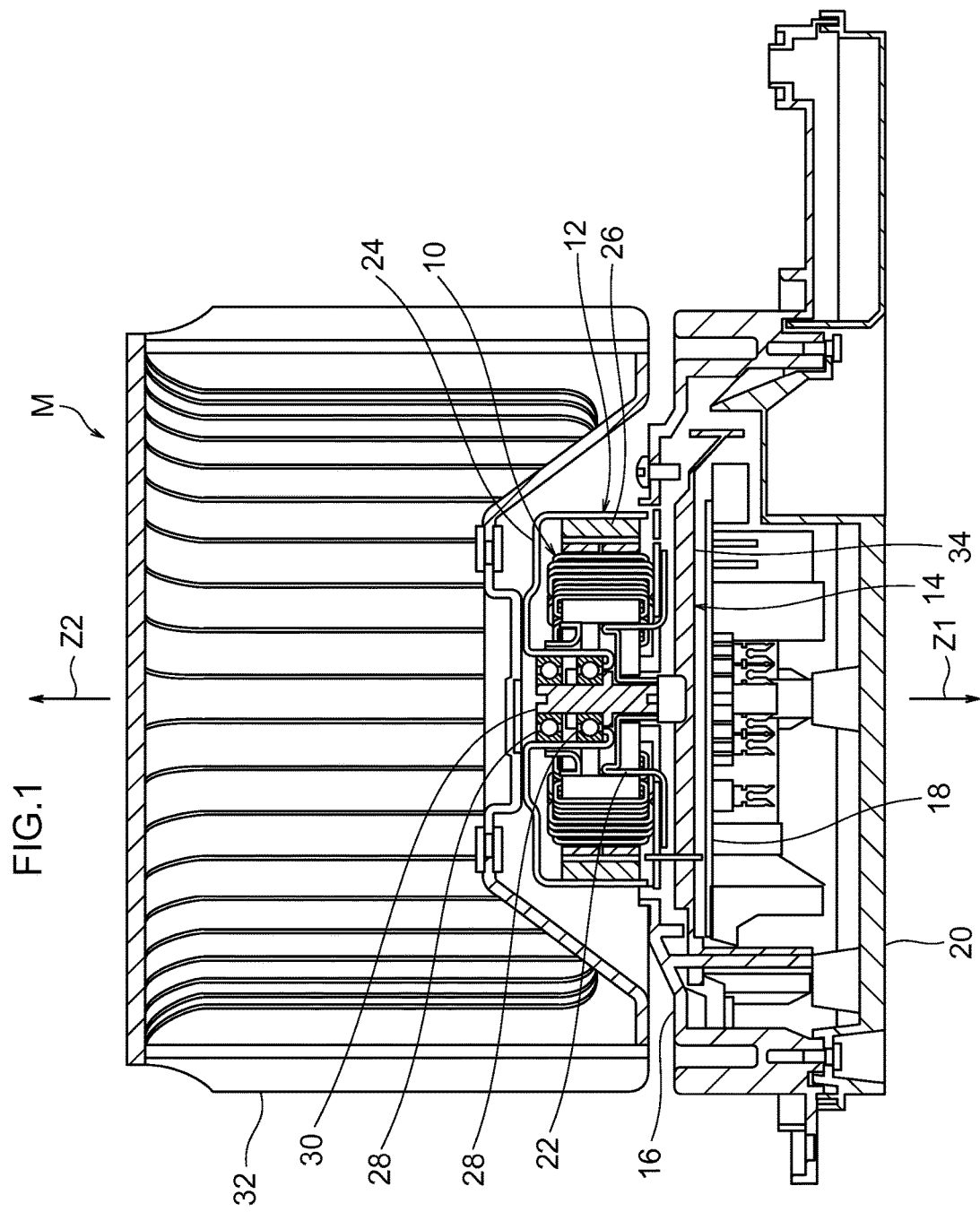
FIG. 1 is a vertical cross-section of a rotating electrical device according to a present exemplary embodiment.

As illustrated in FIG. 1, a rotating electrical device M according to the present exemplary embodiment includes an armature 10 that is a stator, a rotor 12, a centerpiece 14, a motor holder 16, a circuit board 18, and a case 20.

Specifically, the armature 10 is configured as described below, and is formed in a ring shape. Shaft sections 22 provided at an axial center portion of the centerpiece 14 are press-fitted inside the armature 10, such that the armature 10 is supported by the centerpiece 14.

The rotor 12 includes a housing 24 with a lidded cylinder shape, and magnets 26 fitted to an inner peripheral face of the housing 24. The magnets 26 are provided at the radial direction outside of the armature 10, facing toward the armature 10. A pair of bearings 28 is provided at the axial center portion of the housing 24, and a rotation shaft 30 is press-fitted inside the pair of bearings 28. The rotation shaft 30 is supported by the pair of shaft sections 22, such that the rotor 12 is capable of rotating with respect to the armature 10 and the centerpiece 14. As an example, a sirocco fan 32 is fixed to the rotor 12 so as to be capable of rotating as a unit therewith.

The centerpiece 14 includes a circular disk shaped main body portion 34, and the main body portion 34 is provided facing toward an opening in the housing 24. The motor holder 16 is assembled to the main body portion 34 from the armature 10 side of the main body portion 34, and the circuit board 18 is fixed to the main body portion 34 from the opposite side of the main body portion 34 to the armature 10 side. The case 20 is assembled to the main body portion 34 and the motor holder 16 from the opposite side of the circuit board 18 to the main body portion 34 side.

Detailed explanation follows regarding the armature 10.

Figure 2:
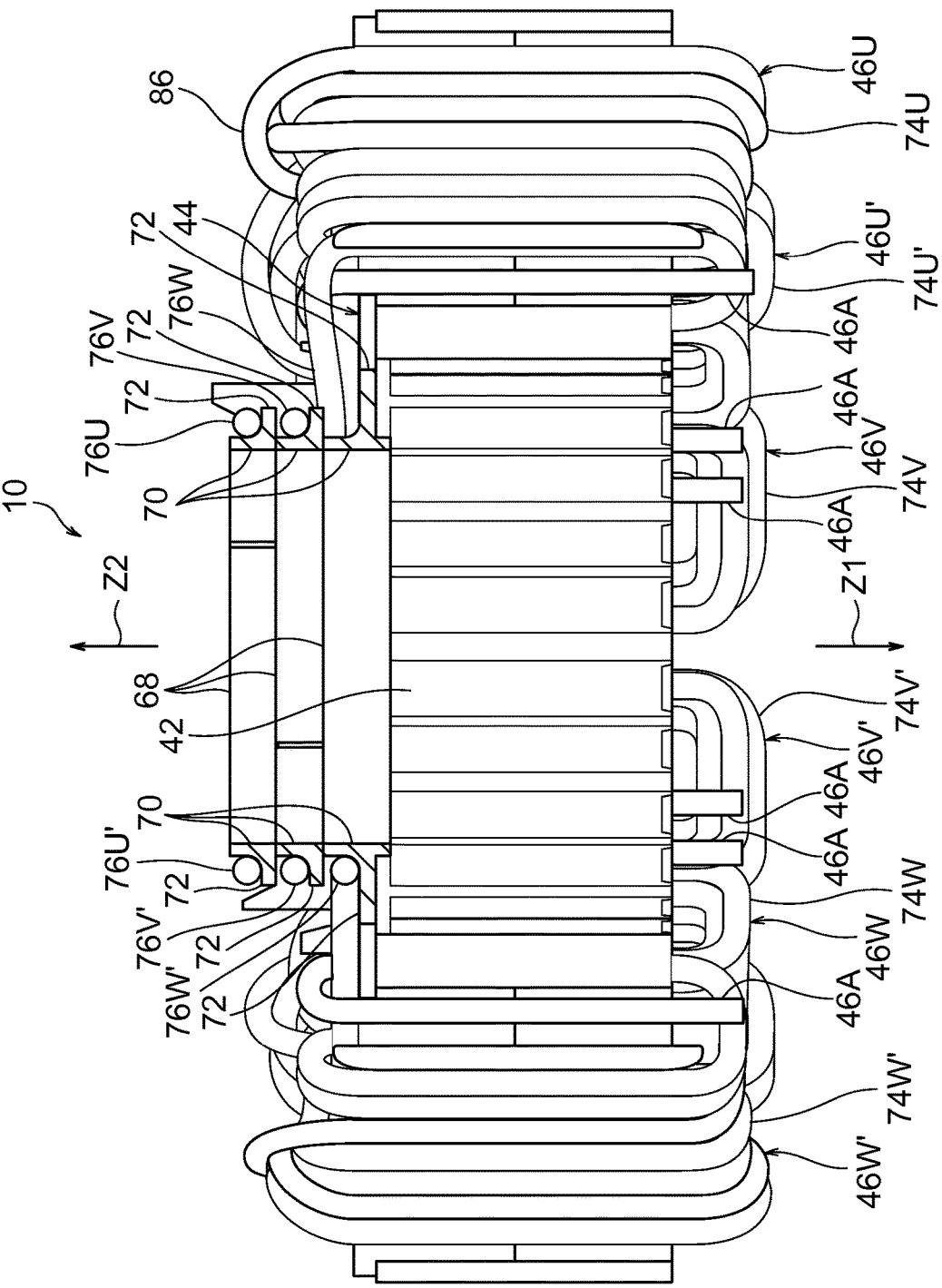
FIG. 2 is a vertical cross-section of the armature illustrated in FIG. 1.
Figure 3:
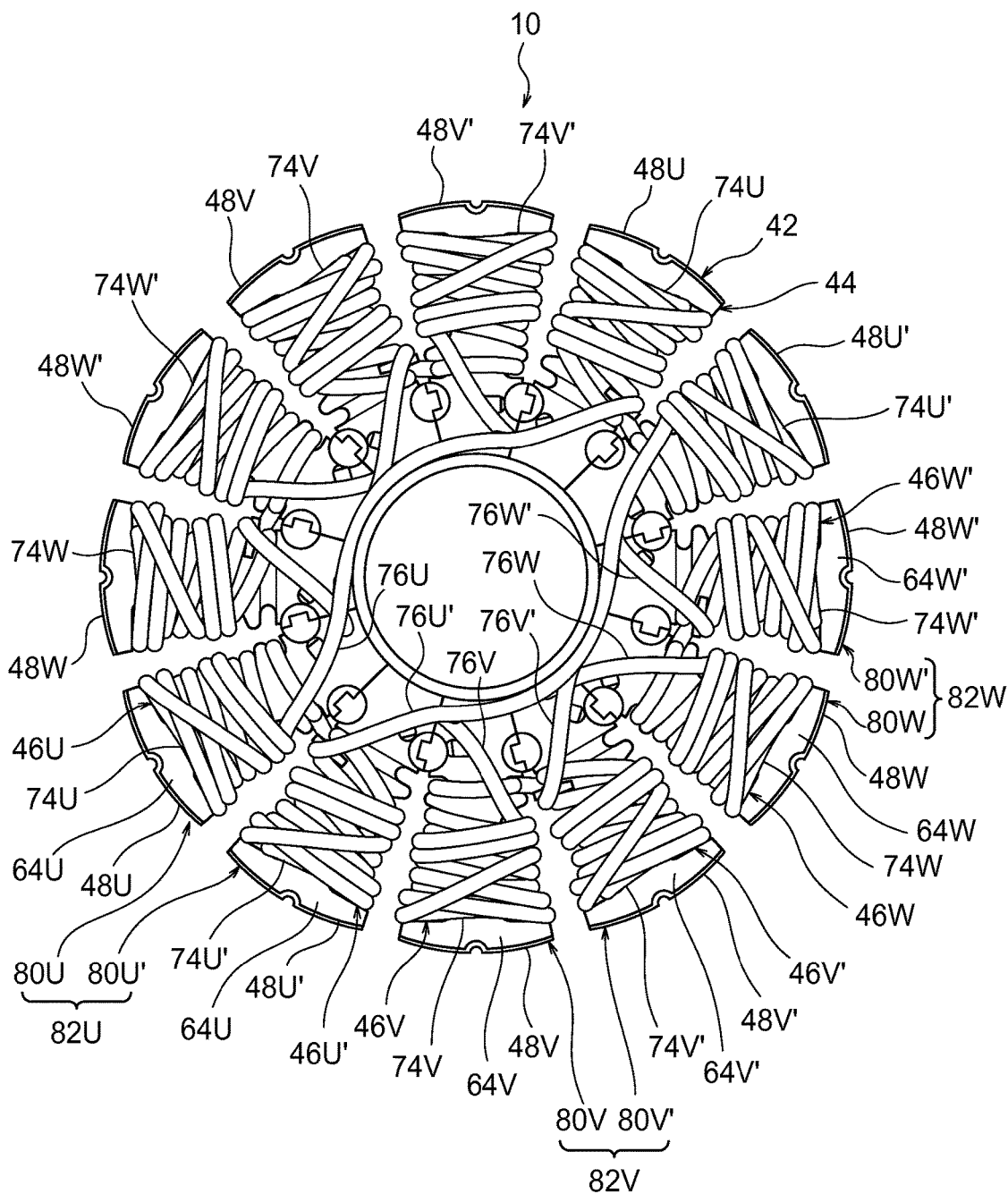
FIG. 3 is a plan view of the armature illustrated in FIG. 1.

As illustrated in FIG. 2 and FIG. 3, the armature 10 includes an armature core 42, an insulating member 44, and plural windings 46U, 46U', 46V, 46V', 46W, 46W' that configure 3 phases, namely a U phase, a V phase, and a W phase. In each of the drawings, the arrow Z1 indicates one axial direction of the armature 10, and the arrow Z2 indicates the other axial direction of the armature 10.

Figure 4:
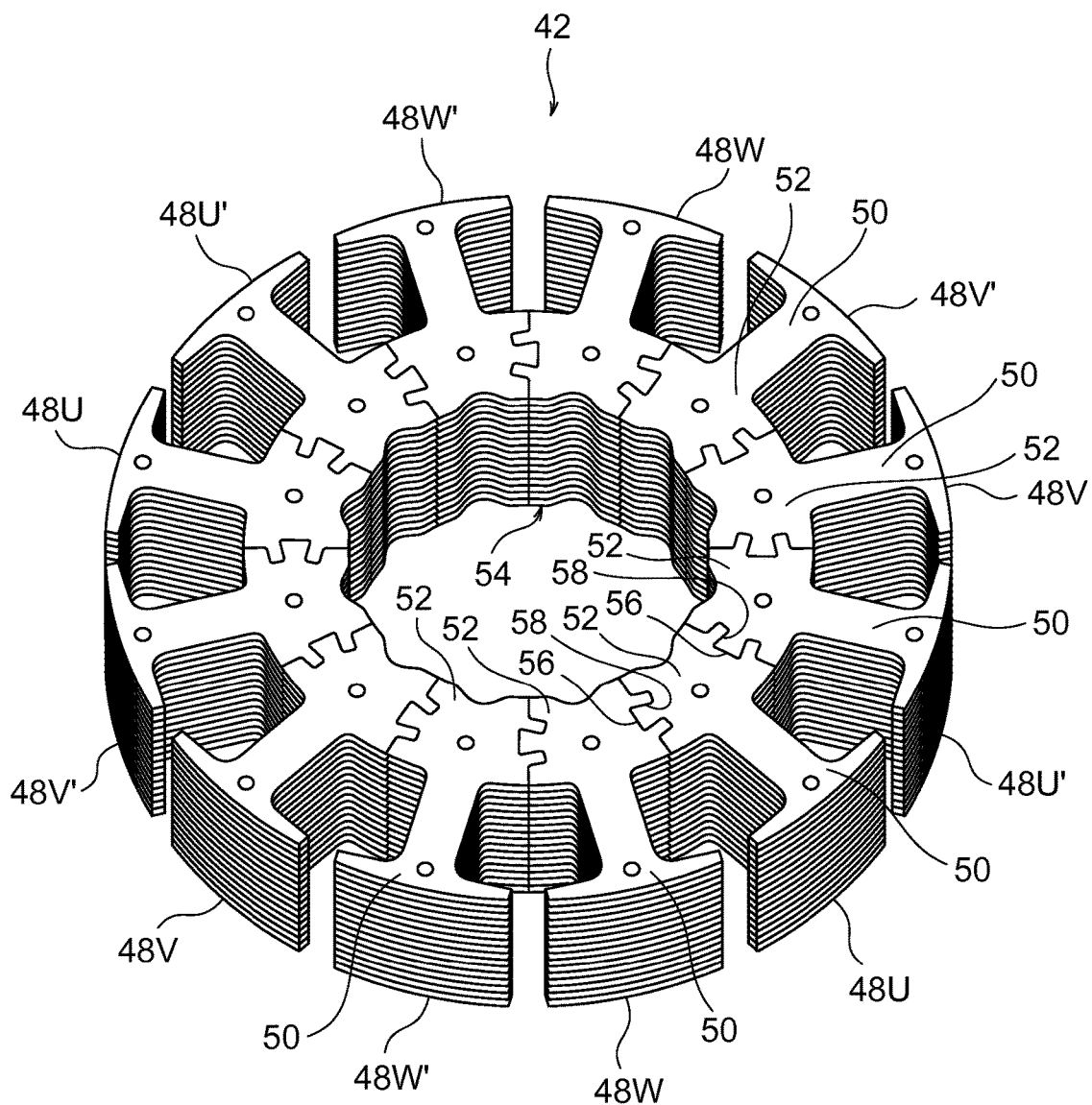
FIG. 4 is a perspective view of the armature core illustrated in FIG. 3.

The armature core 42 is a divided core, and, as illustrated in FIG. 4, is configured by 12 individual core configuration members 48U, 48U', 48V, 48V', 48W, 48W' divided in the circumferential direction of the armature core 42. The plural core configuration members 48U to 48W' each include a tooth portion 50 formed in a substantially T-shape, and a yoke configuration member 52 formed to a base end portion of the tooth portion 50. In a state in which the plural core configuration members 48U to 48W' are arrayed in a ring shape, the plural yoke configuration members 52 form a ring shaped yoke 54, and the plural tooth portions 50 extend in a radiating shape at the periphery of the yoke 54, in a row around the circumferential direction of the yoke 54.

Each of the plural core configuration members 48U to 48W' is provided with a protrusion shaped engaging portion 56, and an indent shaped engaged portion 58. The protrusion shaped engaging portions 56 are formed to one side portion of each of the yoke configuration members 52, and the engaged portions 58 are formed to the other side portion of each of the yoke configuration members 52. The plural core configuration members 48U to 48W' are coupled together in a ring shape by engagement of the engaging portions 56 with the adjacent engaged portions 58.

Figure 5:
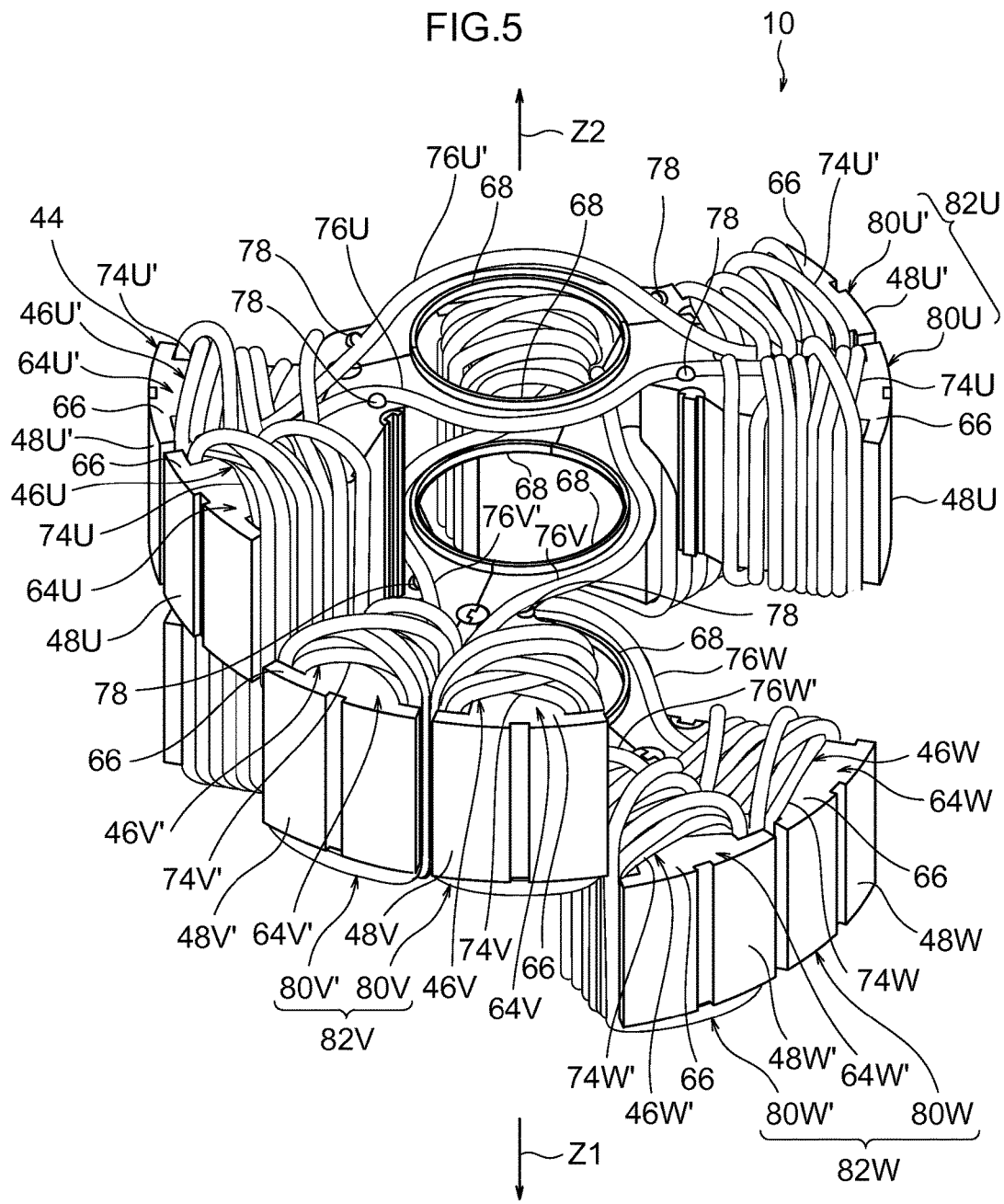
FIG. 5 is a perspective view illustrating a process in which the plural relevant armature configuration sections illustrated in FIG. 3 are assembled together.

As illustrated in FIG. 5, the insulating member 44 is divided into 6 insulators 64U, 64U', 64V, 64V', 64W, 64W'. The insulator 64U and the insulator 64U' of the U phase are formed symmetrically to each other about a plane as viewed along the axial direction of the armature 10. Similarly, the insulator 64V and the insulator 64V' of the V phase are formed symmetrically to each other about a plane as viewed along the axial direction of the armature 10, and the insulator 64W and the insulator 64W' of the W phase are formed symmetrically to each other about a plane as viewed along the axial direction of the armature 10.

The plural insulators 64U to 64W' each include a pair of insulation portions 66 and a coupling portion 68. Each of the insulation portions 66 has an external profile substantially the same as that of the respective core configuration members 48U to 48W', and each of the core configuration members 48U to 48W' is covered from the two axial direction sides of the armature 10 by mounting each of the insulation portions 66 to the respective core configuration members 48U to 48W'.

Each of the coupling portions 68 is formed in a circular arc shape along an inner radial portion of the respective plural core configuration members 48U to 48W', and is coupled to end portions of the pair of insulation portions 66 positioned on the other axial direction side (the arrow Z2 side) of the armature 10. The pair of coupling portions 68 formed to the insulators 64U, 64U' have the same radius as each other, so as to form a ring shape when viewed along the axial direction of the armature 10. Similarly, the pair of coupling portions 68 formed to the insulators 64V, 64V' have the same radius as each other, so as to form a ring shape when viewed along the axial direction of the armature 10. The pair of coupling portions 68 formed to the insulators 64W, 64W' also have the same radius as each other, so as to form a ring shape when viewed along the axial direction of the armature 10.

As illustrated in FIG. 2, each of the coupling portions 68 is formed with an L shaped cross-section profile, and includes a guide portion 70 formed with the armature 10 axial direction as the height direction, and a support portion 72 extending from one end side in the height direction of the guide portion 70 (the arrow Z1 side) toward the radial direction outside of the coupling portion 68. As illustrated in FIG. 5, the insulators 64U, 64V, 64W each have a similar shape to each other, excluding a difference in the forming position of the coupling portion 68 in the armature 10 axial direction. Similarly, the insulators 64U', 64V', 64W' each have a similar shape to each other, excluding a difference in the forming position of the coupling portion 68 in the armature 10 axial direction.

Although not shown in detail in the drawings, each of the insulators 64U to 64W' is configured by an insulator upper including upper portions of the pair of insulation portions 66 and the coupling portion 68, and a pair of insulator lowers that form only lower portions of the pair of insulation portions 66.

Figure 6:
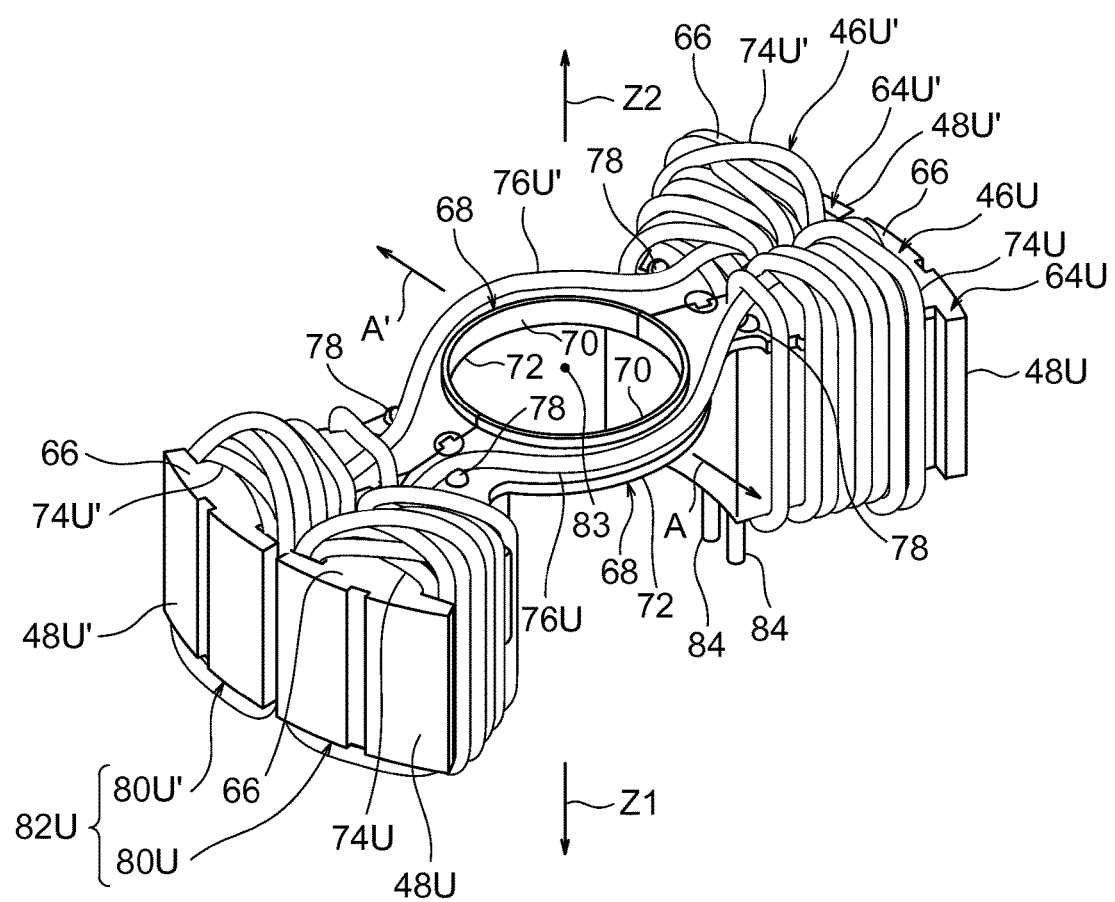
FIG. 6 is a perspective view of the armature configuration sections illustrated in FIG. 5.
Figure 7:
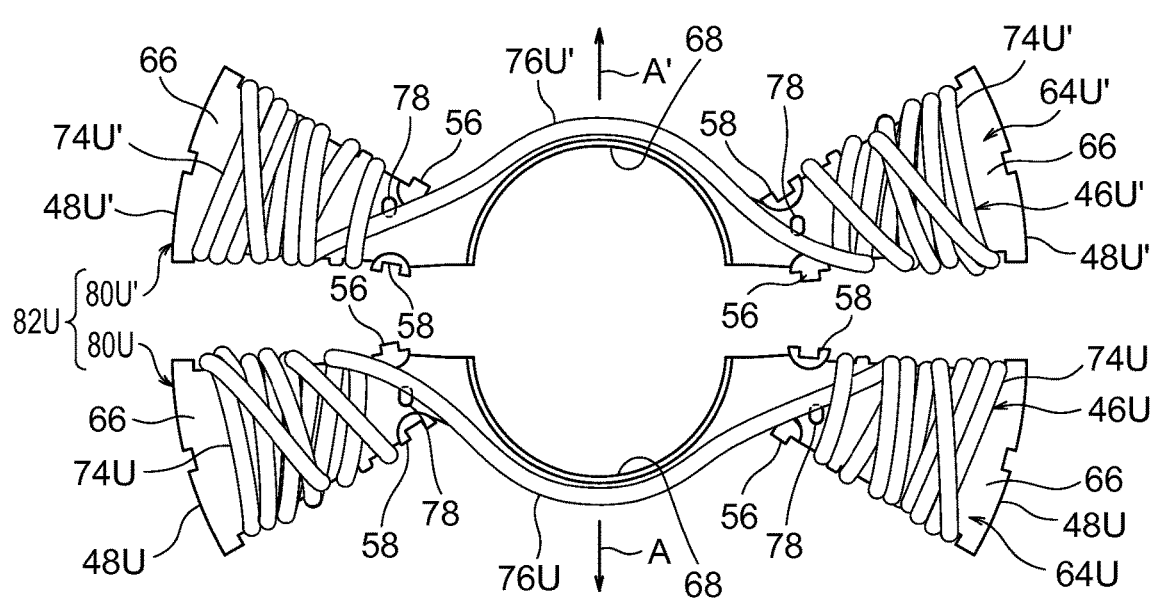
FIG. 7 is an exploded plan view of the armature configuration sections illustrated in FIG. 6.

As illustrated in FIG. 6 and FIG. 7, the winding 46U configuring the U phase includes a pair of wound portions 74U of concentrated winding wound onto the tooth portions 50 of the core configuration members 48U with the insulation portions 66 interposed therebetween, and a crossing wire 76U connecting the pair of wound portions 74U together. Similarly, the winding 46U' configuring the U phase includes a pair of wound portions 74U' of concentrated winding wound onto the tooth portions 50 of the core configuration members 48U' with the insulation portions 66 interposed therebetween, and a crossing wire 76U' connecting the pair of wound portions 74U' together.

The pair of wound portions 74U are wound in a forward direction, and the pair of wound portions 74U' are wound in the opposite direction. Each of the wound portions 74U is wound in a tightening direction such that a winding end terminal portion, or a winding start terminal portion, is positioned on the opposite side to the side where the coupling portion 68 juts out from the pair of core configuration members 48U (the arrow A side). Similarly, each of the wound portions 74U' is wound in a tightening direction such that a winding end terminal portion, or a winding start terminal portion, is positioned on the opposite side to the side where the other coupling portion 68 juts out from the pair of core configuration members 48U' (the arrow A' side).

As illustrated in FIG. 6, the pair of crossing wires 76U, 76U' are both disposed so as to track along the coupling portions 68. More specifically, the crossing wires 76U, 76U' are disposed tracking along the outer peripheral faces of the guide portions 70, and supported from the radial direction inside of the coupling portion 68 by the guide portions 70. Each of the crossing wires 76U, 76U' is supported from the one axial direction side of the armature 10 (the arrow Z1 side) by the support portion 72.

As illustrated in FIG. 5, similarly to the winding 46U described above, the winding 46V configuring the V phase includes a pair of wound portions 74V of concentrated winding wound onto the core configuration members 48V, with the insulation portions 66 interposed therebetween, and a crossing wire 76V connecting the pair of wound portions 74V together. Similarly to the winding 46U' described above, the winding 46V' includes a pair of wound portions 74V' of concentrated winding wound onto the core configuration members 48V', with the insulation portions 66 interposed therebetween, and a crossing wire 76V' connecting the pair of wound portions 74V' together.

Similarly, the winding 46W configuring the W phase includes a pair of wound portions 74W of concentrated winding wound onto the core configuration members 48W, with the insulation portions 66 interposed therebetween, and a crossing wire 76W connecting the pair of wound portions 74W together. Similarly, the winding 46W' includes a pair of wound portions 74W' of concentrated winding wound onto the core configuration members 48W', with the insulation portions 66 interposed therebetween, and a crossing wire 76W' connecting the pair of wound portions 74W' together. The crossing wires 76V to 76W' are supported by the guide portions 70 and the support portions 72 of the coupling portions 68, similarly to the U phase crossing wires 76U and 76U' described above (see FIG. 2).

Further detailed explanation follows regarding the wound portions 74U to 74W' and the crossing wires 76U to 76W' described above, and their peripheral structures for retaining and guiding. The wound portions 74U out of the wound portions 74U to 74W', the crossing wire 76U out of the crossing wires 76U to 76W', and their peripheral structures for retaining and guiding are explained below as an example.

As illustrated in FIG. 8A, the insulation portion 66 provided at a position corresponding to one wound portion 74U of the insulator 64U is formed with a retaining projection 84, a restriction projection 86, and a pair of support portions 88, 90. The retaining projection 84 extends toward one side of the crosswise width direction of the tooth portion 50, and the restriction projection 86 extends toward the other side of the crosswise width direction of the tooth portion 50.

The pair of support portions 88, 90 is positioned at either side of a base end portion of the crosswise width direction of the tooth portion 50. The retaining projection 84 and the restriction projection 86 are positioned closer to the length direction center portion side of the tooth portion 50 than the pair of support portions 88, 90. The retaining projection 84 is formed longer than the one support portion 88, and projects from the support portion 88 to the one crosswise width direction side of the tooth portion 50. The retaining projection 84 and the support portion 88 together form a snap-fit structure 92 (a retaining section).

As illustrated in FIGS. 8B, 8C, a winding start terminal portion 74A of the wound portion 74U is clamped by the snap-fit structure 92. The wound portion 74U is then wound on the tooth portion 50 in three layers, with the insulation portion 66 interposed therebetween. The numbers appended inside the cross-section of the wound portion 74U illustrated in FIG. 8C indicate the winding sequence (the turn order) of the wound portion 74U. As illustrated in FIG. 8C, the first layer of the wound portion 74U is wound on in sequence from the base end portion toward a leading end portion of the tooth portion 50 ($0.5^{th}$ turn to $7.5^{th}$ turn), and the second layer of the wound portion 74U is wound on in sequence from the leading end portion toward a length direction center portion of the tooth portion 50 ($8.0^{th}$ turn to $10.5^{th}$ turn). The third layer of the wound portion 74U is wound on in sequence from the length direction center portion side toward the leading end portion of the tooth portion 50 ($11.0^{th}$ turn to $12.5^{th}$ turn).

The wound portion 74U includes a section 74B wound on the base end portion side of the tooth portion 50 with respect to the second layer ($13.0^{th}$ turn to $15.0^{th}$ turn). In the wound portion 74U, the number of turns of the winding differs by 0.5 turns between the left and right of the tooth portion 50 (in FIG. 8C, the left side becomes 0.5 turns more than the right side at each progression toward the leading end portion of the tooth portion 50). Due to the number of turns of the winding at the left and right of the tooth portion 50 differing by 0.5 turns in this manner, the winding start terminal portion 74A at the winding start of the wound portion 74U ($0.5^{th}$ turn) and a terminal portion 76A at a crossing start of the crossing wire 76U ($15.5^{th}$ turn) are positioned at side portions on the same side (right side) of the tooth portion 50. The winding start terminal portion 74A of the wound portion 74U is positioned further to the base end portion side of the tooth portion 50 than the crossing start terminal portion 76A of the crossing wire 76U, and the retaining projection 84 is interposed between the winding start terminal portion 74A of the wound portion 74U and the crossing start terminal portion 76A of the crossing wire 76U.

The wound portion 74U ($1.0^{th}$ turn to $15.0^{th}$ turn) is supported from the base end portion side of the tooth portion 50 by base end portions of the retaining projection 84 and the restriction projection 86. The crossing start terminal portion 76A of the crossing wire 76U ($15.5^{th}$ turn) is guided from the base end portion side of the tooth portion 50 by a leading end portion of the retaining projection 84. A curved face 84A that curves along an outer peripheral face of the crossing start terminal portion 76A of the crossing wire 76U is formed to the leading end portion of the retaining projection 84. As described above, the crossing wire 76U is disposed tracking along the coupling portion 68, and is connected to the other wound portion 74U at the opposite side (see FIG. 10).

As illustrated in FIGS. 8A, 8B, and 8C, guide projections 78 are provided to portions of the insulator 64U connecting between the respective insulation portions 66 and the coupling portion 68, with their height directions in the axial direction of the armature 10 (so as to project toward the other axial direction side of the armature 10). As schematically illustrated in FIG. 9, each of the guide projections 78 includes an inclined face 78A disposed further toward the side the coupling portion 68 juts out in (the arrow A side) on progression toward the upper side in the height direction (the arrow Z2 side). A portion 76B at the crossing start terminal portion 76A side of the crossing wire 76U is guided toward the coupling portion 68 side (and supported) by the inclined face 78A of the guide projection 78, and is placed between the engaging portion 56 and the engaged portion 58 formed at side portions on both sides of the core configuration member 48U (see FIGS. 8A, 8B, and 8C).

Figure 10:
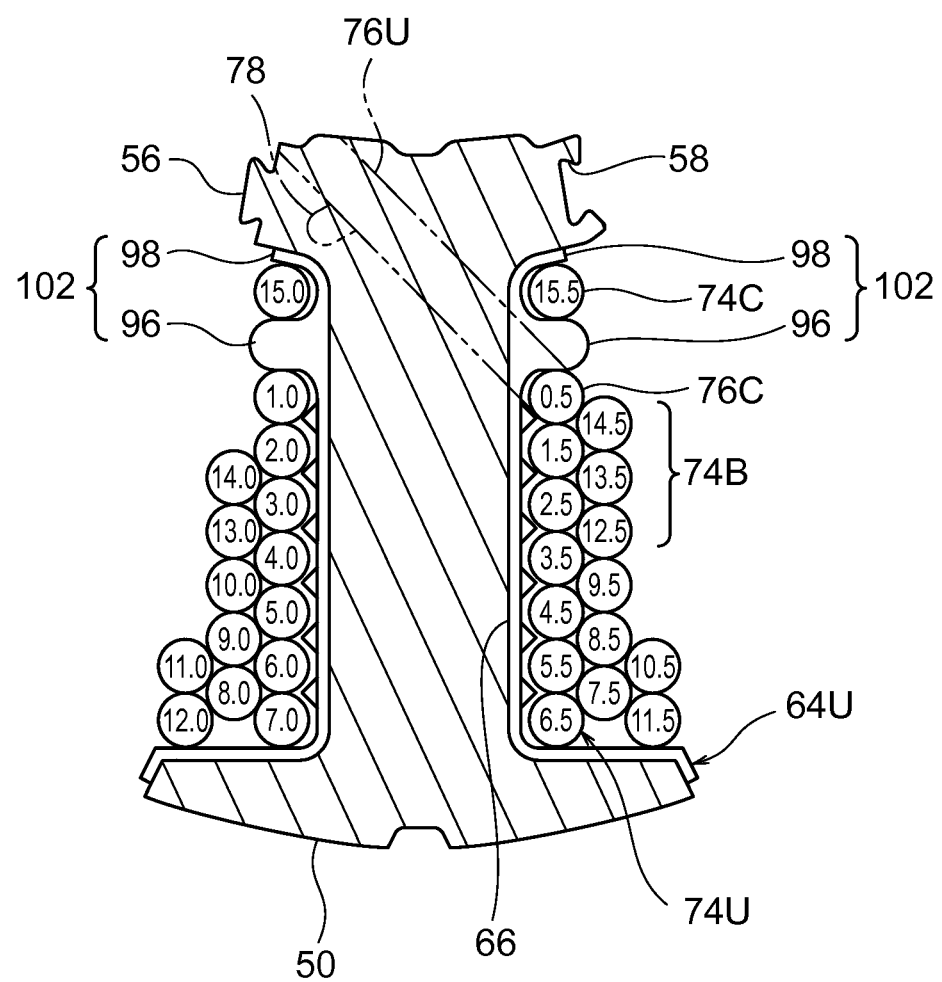
FIG. 10 is an enlarged view of relevant portions of the wound portion on the opposite side that is connected through the crossing wire to the wound portion illustrated in FIGS. 8A, 8B, and 8C, and of peripheral portions thereof.

As illustrated in FIG. 10, a pair of restricting projections 96, and a pair of supporting portions 98 are formed to the insulation portion 66 provided in the position corresponding to the other wound portion 74U of the insulators 64U. One of the restricting projections 96 extends toward one crosswise width direction side of the tooth portion 50, and the other restricting projection 96 extends toward the other crosswise width direction side of the tooth portion 50. The pair of supporting portions 98 are positioned at both sides of the base end portion of the tooth portion 50, spreading out to both crosswise width direction sides of the tooth portion 50. The pair of restricting projections 96 is positioned more to the length direction center portion side of the tooth portion 50 than the pair of supporting portions 98. The respective restricting projections 96 and supporting portions 98 together form a snap-fit structure 102.

The other wound portion 74U is wound on the tooth portion 50 in three layers with the insulation portion 66 interposed therebetween. The numbers appended inside the cross-section of the wound portion 74U illustrated in FIG. 10 indicate the winding sequence (the turn order) of the wound portion 74U. As illustrated in FIG. 10, the first layer of the wound portion 74U is wound on in sequence from the pair of restricting projections 96 toward the leading end portion of the tooth portion 50 ($0.5^{th}$ turn to $7.0^{th}$ turn), and the second layer of the wound portion 74U is wound on in sequence from the leading end portion toward the length direction center portion of the tooth portion 50 ($7.5^{th}$ turn to $10.0^{th}$ turn). The third layer of the wound portion 74U is wound on in sequence from the length direction center portion side toward the leading end portion of the tooth portion 50 ($10.5^{th}$ turn to $12.0^{th}$ turn).

The wound portion 74U includes a section 74B wound on the base end portion side of the tooth portion 50 with respect to the second layer ($12.5^{th}$ turn to $14.5^{th}$ turn). In the wound portion 74U, the number of turns of the winding differs by 0.5 turns between the left and right of the tooth portion 50 (in FIG. 10 the right side becomes 0.5 turns more than the left side at each progression toward the base end portion of the tooth portion 50). Due to the number of turns of the winding at the left and right of the tooth portion 50 differing by 0.5 turns in this manner, a crossing end terminal portion of the crossing wire 76U ($0.5^{th}$ turn) and a winding end terminal portion 74C of the wound portion 74U ($15.5^{th}$ turn) are positioned at side portions on the same side (right side) of the tooth portion 50. The winding end terminal portion 74C of the wound portion 74U is positioned further to the base end portion side of the tooth portion 50 than the crossing end terminal portion 76C of the crossing wire 76U. The winding end terminal portion 74C of the wound portion 74U ($15.0^{th}$ turn and $15.5^{th}$ turn) is clamped by the snap-fit structures 102. The wound portion 74U ($0.5^{th}$ turn to $14.5^{th}$ turn) is supported from the base end portion side of the tooth portion 50 by the pair of restricting projections 96.

Although an example has been explained in FIG. 8A to FIG. 10 of the wound portions 74U, the crossing wire 76U, and their peripheral structures for retaining and guiding, the pair of wound portions 74U' and the peripheral structures thereof illustrated in FIG. 7 are symmetrical about a plane to the pair of wound portions 74U and the peripheral structures thereof described above. Moreover, the wound portions 74V, 74W and the peripheral structures thereof illustrated in FIG. 5 are similar to the pair of wound portions 74U and the peripheral structures thereof described above, and the pair of wound portions 74V' and the peripheral structures thereof, and the pair of wound portions 74W' and the peripheral structures thereof are symmetrical about a plane to the pair of wound portions 74U and the peripheral structures thereof described above.

A guide projection 78 illustrated in FIG. 9 is also formed at the crossing end side of the crossing wire 76 illustrated in FIG. 10. A terminal portion 76C side portion of the crossing wire 76 is guided to the coupling portion 68 side (see FIG. 8A, 8B, 8C) by the guide projection 78, and is thereby positioned between the engaging portion 56 and the engaged portion 58 formed at the side portions on both sides of the core configuration member 48. The guide projections 78 are also formed to the insulators 64U' to 64W' described above (see FIG. 5, and so on). The terminal portion side portions of the crossing wires 76U' to 76W' are also guided by the guide projections 78, similarly to the crossing wire 76U.

In the armature 10, as illustrated in FIG. 7, an armature configuration unit 80U is configured by assembling the pair of core configuration members 48U to one of the insulators 64U configuring the U phase, and winding the winding 46U onto the tooth portions 50 of the pair of core configuration members 48U. An armature configuration unit 80U' is also configured by assembling the pair of core configuration members 48U' to the other of the insulators 64U configuring the U phase, and winding the winding 46U' onto the tooth portions 50 of the pair of core configuration members 48U'. Armature configuration units 80V, 80V', 80W, 80W' are also configured for the V phase and the W phase (see FIG. 5) similarly to the armature configuration units 80U, 80U' of the U phase. The six armature configuration units 80U to 80W' are each configured independently of each other.

As illustrated in FIG. 5, in each of the armature configuration units 80U to 80W', the respective pairs of core configuration members 48U to 48W' are each placed so as to leave a gap equivalent to four of the core configuration members between each other. Namely, in the armature configuration unit 80U, a gap is provided between the pair of core configuration members 48U for placing the two individual core configuration members 48V, 48V' of the V phase and the two individual core configuration members 48W, 48W' of the W phase into. Similarly, in the armature configuration unit 80U', a gap is provided between the pair of core configuration members 48U' for placing the two individual core configuration members 48V, 48V' of the V phase and the two individual core configuration members 48W, 48W' of the W phase into. Similar also applies to the armature configuration units 80V to 80W'.

As illustrated in FIG. 5, the six armature configuration units 80U to 80W' (the units thereof configuring the same phase as each other) are combined together adjacently to configure three armature configuration sections 82U, 82V, 82W. Namely, the armature configuration units 80U, 80U' are combined together to configure the armature configuration section 82U (see FIG. 6). Similarly, the armature configuration units 80V, 80V' are combined together to configure the armature configuration section 82V, and the armature configuration units 80W, 80W' are combined together to configure the armature configuration section 82W.

Fixing of the pair of armature configuration units 80U, 80U' together to configure the armature configuration section 82U is performed by engaging the engaging portion 56 and the engaged portion 58 of the adjacent core configuration members 48 (see FIG. 4). Similar also applies to fixing of the pair of armature configuration units 80V, 80V' together to configure the armature configuration section 82V, and to fixing of the pair of armature configuration units 80W, 80W' together to configure the armature configuration section 82W.

Moreover, as illustrated in FIG. 6, in the armature configuration section 82U, the pair of crossing wires 76U, 76U' are respectively disposed so as to track along the pair of the coupling portions 68. Moreover, in the armature configuration section 82U, the coupling portion 68 and the crossing wire 76 provided to the armature configuration unit 80U (one of the coupling portions 68 and one of the crossing wires 76), and the coupling portion 68 and the crossing wire 76 provided to the armature configuration unit 80U' (the other of the coupling portions 68 and the other of the crossing wires 76), are provided divided at one side (the arrow A side) and the other side (the arrow A' side) of an axial center 83 of the armature configuration section 82U. The axial center 83 of the armature configuration section 82U corresponds to the radial direction center of the armature configuration section 82U (the center of the pair of coupling portions 68 forming a ring shape). The pair of coupling portions 68 provided to the armature configuration section 82U form a ring shape in the combined state of the pair of the armature configuration units 80U, 80U'.

Similarly, as illustrated in FIG. 5, in the armature configuration section 82V, the coupling portion 68 and the crossing wire 76V provided to the armature configuration unit 80V, and the coupling portion 68 and the crossing wire 76V' provided to the armature configuration unit 80V', are provided divided at one side and at the other side of the axial center of the armature configuration section 82V. In the armature configuration section 82W, the coupling portion 68 and the crossing wire 76W provided to the armature configuration unit 80W, and the coupling portion 68 and the crossing wire 76W' provided to the armature configuration unit 80W', are provided divided at one side and at the other side of the axial center of the armature configuration section 82W. The pair of coupling portions 68 provided to the armature configuration section 82V form a ring shape in the combined state of the pair of the armature configuration units 80V, 80V', and the pair of coupling portions 68 provided to the armature configuration section 82W form a ring shape in the combined state of the pair of the armature configuration units 80W, 80W'.

Then, as illustrated in FIG. 5, the plural armature configuration sections 82U to 82W are assembled together along the axial direction. When this is performed, the armature configuration section 82U of the U phase is the uppermost layer, the armature configuration section 82V of the V phase is an intermediate layer, and the armature configuration section 82W of the W phase is the lowermost layer. In a state in which the plural armature configuration sections 82U to 82W have been assembled together along the axial direction, the plural core configuration members 48U to 48W' are arrayed in the sequence U→U'→V-→V'→W→W'→U'→U→V'→V→W'→W running anti-clockwise, as viewed from the other axial direction side (the arrow Z2 side) of the armature 10.

As illustrated in FIG. 2, in the assembled together state of the plural armature configuration sections 82U to 82W as described above, a terminal portion 46A of each of the windings 46 is guided to one axial direction side (the Z1 side) of the armature 10, and the plural coupling portions 68 are disposed at the other axial direction side (the arrow Z2 side) of the armature 10, in a row (overlapping with each other) along the axial direction of the armature 10.

In a state in which the plural armature configuration sections 82U to 82W have been thus assembled together, the plural crossing wires 76U to 76W' pass further to the inside than inner radial portions of the plural core configuration members 48. Out of the plural crossing wires 76U to 76W', the crossing wires 76V, 76V' in the armature configuration section 82V of the intermediate layer are disposed between the coupling portion 68 of the U phase and the coupling portion 68 of the W phase, these being the upper and lower layers.

Explanation follows regarding operation and advantageous effects of the present invention.

Note that in the following explanation regarding operation and advantageous effects, the letters U, U', V, V', W, W' are dropped from the end of the reference numerals in the drawings when no distinction is made between the U phase, the V phase and the W phase. The letters U, U', V, V', W, W' are appended to the reference numerals when distinction is made between the U phase, the V phase and the W phase.

As described in detail above, in the armature 10 according to the present exemplary embodiment, the insulators 64 are each provided with the retaining projection 84 that retains the winding start terminal portion 74A of the wound portion 74, and guides the crossing start terminal portion 76A of the crossing wire 76 (see FIG. 8A, FIG. 8B, FIG. 8C). Even when the winding start terminal portion 74A of the wound portion 74 and the crossing start terminal portion 76A of the crossing wire 76 are positioned at side portions on the same side of the tooth portion 50 (side portions on the same side as each other in the circumferential direction for each of the plural tooth portions 50) due to the number of turns of winding differing by 0.5 turns at the left and right of the tooth portion 50, the crossing start terminal portion 76A of the crossing wire 76 is guided by the retaining projection 84 retaining the winding start terminal portion 74A of the wound portion 74, such that positional misalignment of the crossing start terminal portion 76A of the crossing wire 76 can be suppressed. This thereby enables interference of the crossing start terminal portion 76A of the crossing wire 76 with other portions (such as the ring shaped yoke 54 illustrated in FIG. 4, and so on) to be suppressed.

Since the wound portion 74 is supported by the base end portion of the retaining projection 84, a collapse in the shape of the wound portion 74 can accordingly be suppressed. This thereby enables interference between adjacent wound portions 74 to be suppressed, even when the armature 10 is assembled by assembling the plural armature configuration sections 82U, 82V, 82W together.

Since the crossing start terminal portion 76A of the crossing wire 76 is guided by the leading end portion of the retaining projection 84, the leading end portion of the retaining projection 84 can be effectively utilized to guide the crossing start terminal portion 76A of the crossing wire 76.

Since the curved face 84A that runs along the outer peripheral face of the crossing start terminal portion 76A of the crossing wire 76 is formed to the leading end portion of the retaining projection 84, the crossing start terminal portion 76A of the crossing wire 76 can be smoothly guided by the leading end portion of the retaining projection 84.

The insulator 64 is provided with the support portion 88 that retains the winding start terminal portion 74A of the wound portion 74 in cooperation with the retaining projection 84, and the support portion 88 and the retaining projection 84 (support portions) configure the snap-fit structure 92 that clamps the winding start terminal portion 74A of the wound portion 74. The winding start terminal portion 74A of the wound portion 74 can thereby be retained by the snap-fit structure 92, thus enabling positional misalignment of the winding start terminal portion 74A of the wound portion 74 to be suppressed.

Space at a bottom portion side of slots formed between the tooth portions 50 can be effectively utilized by clamping the winding start terminal portion 74A of the wound portion 74 with the snap-fit structure 92. This enables the number of windings of the wound portion 74 to be increased, and the space factor of the wound portion 74 to be enhanced.

As illustrated in FIG. 4, each of the plural core configuration members 48 is provided with an engaging portion 56 and an engaged portion 58, and the plural core configuration members 48 are coupled together in a ring shape by engagement of the adjacent engaging portions 56 and engaged portions 58. The adjacent engaging portions 56 and engaged portions 58 thereby enable rattling of the plural core configuration members 48 coupled in a ring shape to be suppressed.

Moreover, as illustrated in FIGS. 8A, 8B, 8C and FIG. 10, the guide projections 78 are provided to the portions of the insulators 64 connecting between the insulation portions 66 and the coupling portions 68. A portion of the terminal portion side of the crossing wires 76 is guided by the guide projection 78 to the coupling portion 68 side, and is thereby placed between the engaging portion 56 and the engaged portion 58 formed to side portions on both sides of the core configuration members 48. The crossing wires 76 can accordingly be suppressed from becoming jammed between adjacent respective engaging portions 56 and engaged portions 58, even during engagement of the adjacent engaging portions 56 and engaged portions 58 to couple together the adjacent core configuration members 48.

The crossing wires 76 pass to the inside of the inner radial portions of the plural core configuration members 48 (see FIG. 2). This also enables the crossing wires 76 to be suppressed from becoming jammed between the adjacent respective engaging portions 56 and engaged portions 58 during coupling together of the adjacent core configuration members 48 using the engaging portions 56.

As illustrated in FIG. 5 to FIG. 7, the pairs of core configuration members 48 are assembled to each of the plural insulators 64 U to 64W', and the windings 46 are wound onto the pairs of core configuration members 48, so as to configure sets of the plural, mutually independent, armature configuration units 80U to 80W'. The plural armature configuration units 80U to 80W' are combined so as to be adjacent to each other, thus configuring the plural armature configuration sections 82U to 82W.

The plural sets of armature configuration sections 82U to 82W are disposed such that the pairs of crossing wires 76 track along the respective pairs of the coupling portions 68, with one of the coupling portions 68 and one of the crossing wires 76, and the other of the coupling portions 68 and the other of the crossing wires 76, divided in the respective armature configuration sections 82U to 82W at the one side and at the other side of the axial center. The pairs of crossing wires 76 on each of the armature configuration sections 82U to 82W do not cross each other, even when the plural armature configuration sections 82U to 82W are assembled together to configure the armature 10, thereby suppressing an increase in the axial length of the armature 10. The armature 10 can accordingly be configured with a shorter axial length than in a case in which the respective pairs of crossing wires 76 cross each other in each of the armature configuration sections 82U to 82W.

Explanation follows regarding modified examples of the present exemplary embodiment.

In the exemplary embodiment described above, the retaining projection 84 is provided corresponding to the crossing start terminal portion 76A of the crossing wire 76U; however a retaining projection 84 may be provided corresponding to a crossing end terminal portion 76C of the crossing wire 76U. Retaining projections 84 may also be provided corresponding to both the crossing start terminal portion 76A and the terminal portion 76C of the crossing wire 76U. The same applies to crossing wires 76U' to 76W'.

The armature 10 configures a stator of an outer rotor type rotating electrical device; however it may configure a stator of an inner rotor type rotating electrical device. Other than a stator of a brushless motor, the armature 10 may also configure a rotor of a brushed direct current motor.

The armature 10 includes the twelve core configuration members 48U to 48W', the six insulators 64U to 64W', and the plural windings 46U to 46W' configuring the U, V, and W phases, however the respective numbers of each are not limited to the above. In such cases, the respective pairs of the core configuration members may each be disposed in the armature configuration units 80U to 80W' so as to leave a gap equivalent to one or more core configuration member between each other.

The armature core 42 is divided into plural core configuration members 48U to 48W; however it may be configured by a single member (without being divided).

Moreover, a pair of the insulation portions 66 are provided to each of the insulators 64U to 64W' (two each); however configuration may be made such that three or more of the insulation portions 66 are provided to each of the insulators 64U to 64W'.

The U phase insulator 64U and insulator 64U' are formed symmetrically about a plane as viewed along the armature 10 axial direction; however they need not be symmetrical about a plane. Similar applies for the V phase insulators 64V, 64V' and the W phase insulators 64W, 64W'.

Each of the insulation portions 66 is integrated with the core configuration members 48U to 48W' by being attached to the respective core configuration members 48U to 48W; however they may be integrated with the core configuration members 48U to 48W' by being integral molding (mold forming).

Although the armature 10 is provided with the insulators 64U to 64W' divided into plural members, the insulators 64U to 64W' may be integrated together.

Each of the plural core configuration members 48U to 48W' is provided with the engaging portion 56 and the engaged portion 58, and the plural core configuration members 48U to 48W' are coupled together so as to form a ring shape by engagement of the adjacent engaging portions 56 and engaged portions 58 with each other. However, each of the plural core configuration members 48U to 48W' may, for example, be independently connected to the centerpiece 14, without being coupled in a ring shape.

All of the plural crossing wires 76U to 76W' pass further to the inside than the inner radial portions of the plural core configuration members 48; however, for example, the crossing wires 76U, 76U' of the U phase armature configuration section 82U of the uppermost layer may pass further to the outside than the inner radial portions of the plural core configuration members 48. Note that the crossing wires 76U, 76U' can still be suppressed from becoming jammed between the adjacent respective engaging portions 56 and engaged portions 58, even when the crossing wires 76U, 76U' of the U phase armature configuration section 82U of the uppermost layer pass further to the outside than the inner radial portions of the plural core configuration members 48.

Each of the coupling portions 68 formed to each of the plural insulators 64U to 64W' are formed in a circular arc shape; however they may also be formed in a shape other than a circular arc shape.

Each of the wound portions 74U to 74W' are wound in the tightening direction; however they may also be wound in a loosening direction.

Explanation has been given above of an exemplary embodiment of the invention; however the present invention is not limited to the above, and obviously various modifications are implementable within a scope not departing from the spirit thereof.

What is claimed is:

1. An armature comprising:
an armature core that includes a plurality of tooth portions extending in a radial direction and disposed in a row around a circumferential direction, the armature core being configured by a plurality of core configuration members divided in the circumferential direction;
a plurality of insulators, each including a plurality of insulation portions integrated with the armature core and a coupling portion that couples the plurality of insulation portions together;
a plurality of windings each including a plurality of wound portions wound on the tooth portions with the insulation portions interposed between the wound portions and the tooth portions, and a crossing wire connecting the plurality of wound portions together;
wherein:
at a tooth portion, a winding start terminal portion of a wound portion and a crossing start terminal portion of a crossing wire are positioned at side portions of the tooth portion on the same side as each other in the circumferential direction,
each insulator is provided with a retaining section that retains the winding start terminal portion of the wound portion and guides the crossing start terminal portion of the crossing wire,
a plurality of mutually independent armature configuration units are configured by assembling a pair of the core configuration members to each of the plurality of insulators, and winding one of the plurality of windings on the tooth portions of the pair of core configuration members,
a plurality of armature configuration portions are configured by assembling adjacent armature configuration units from the plurality of armature configuration units together, and
in each of the plurality of armature configuration portions, a pair of crossing wires is disposed so as to track along each of the pairs of the coupling portions, and one of the coupling portions and one of the crossing wires, and another of the coupling portions and another of the crossing wires, are divided at one side and at the other side of an axial center of the armature configuration portions.

2. The armature of claim 1, wherein:
the retaining section is provided with a retaining projection that guides the crossing start terminal portion of the crossing wire, and a supporting portion that retains the winding start terminal portion of the wound portion in cooperation with the retaining projection;
the wound portion is supported by a base end portion of the retaining projection; and
the crossing start terminal portion of the crossing wire is guided by a leading end portion of the retaining projection.

3. The armature of claim 2, wherein:
a curved face is formed at the leading end portion of the retaining projection so as to curve along a peripheral face of the crossing start terminal portion of the crossing wire.

4. The armature of claim 2, wherein the retaining projection is interposed between the winding start terminal portion of the wound portion and the crossing start portion of the crossing wire.

5. An armature, comprising:
an armature core that includes a plurality of tooth portions extending in a radial direction and disposed in a row around a circumferential direction;
a plurality of insulators, each including a plurality of insulation portions integrated with the armature core and a coupling portion that couples the plurality of insulation portions together; and
a plurality of windings each including a plurality of wound portions wound on the tooth portions with the insulation portions interposed between the wound portions and the tooth portions, and a crossing wire connecting the plurality of wound portions together,
wherein:
at a tooth portion, a terminal portion of a wound portion and a terminal portion of a crossing wire are positioned at side portions of the tooth portion on the same side as each other in the circumferential direction,
each insulator is provided with a retaining section that retains the terminal portion of the wound portion and guides the terminal portion of the crossing wire,
the armature core is configured by a plurality of core configuration members divided in the circumferential direction of the armature core,
each of the plurality of core configuration members is provided with an engaged portion and an engaging portion,
the plurality of core configuration members are coupled together in a ring shape by engaging adjacent engaged portions and engaging portions,
the insulation portions are provided with a guiding projection,
a portion of the crossing wire on the terminal portion side is positioned between the engaged portion and the engaging portion formed at respective side portions on both sides of the core configuration member by being guided by the guiding projection to the side of a coupling portion that couples the insulation portions,
a plurality of mutually independent armature configuration units are configured by assembling a pair of the core configuration members to each of the plurality of insulators, and winding one of the plurality of windings on the tooth portions of the pair of core configuration members, a plurality of armature configuration portions are configured by assembling adjacent armature configuration units from the plurality of armature configuration units together, and in each of the plurality of armature configuration portions, a pair of crossing wires is disposed so as to track along each of the pairs of the coupling portions, and one of the coupling portions and one of the crossing wires, and another of the coupling portions and another of the crossing wires, are divided at one side and at the other side of the axial center of the armature configuration portions.

6. The armature of claim 5, wherein:

the crossing wire passes further to the inside than an inner radial portion of the plurality of core configuration members.

7. A rotating electrical device provided with the armature of claim 1.

8. An armature comprising:

an armature core that includes a plurality of tooth portions extending in a radial direction and disposed in a row around a circumferential direction, the armature core being configured by a plurality of core configuration members divided in the circumferential direction;

a plurality of insulators, each including a plurality of insulation portions integrated with the armature core and a coupling portion that couples the plurality of insulation portions together; and a plurality of windings each including a plurality of wound portions wound on the tooth portions with the insulation portions interposed between the wound portions and the tooth portions, and a crossing wire connecting the plurality of wound portions together;

wherein, at a tooth portion, a winding start terminal portion of a wound portion and a crossing start terminal portion of a crossing wire are positioned at side portions of the tooth portion on the same side as each other in the circumferential direction, wherein each insulator is provided with a retaining section that retains the winding start terminal portion of the wound portion and guides the crossing start terminal portion of the crossing wire, wherein the retaining section is provided with a retaining projection that guides the crossing start terminal portion of the crossing wire, and a supporting portion that retains the winding start terminal portion of the wound portion in cooperation with the retaining projection, wherein the wound portion is supported by a base end portion of the retaining projection, and the crossing start terminal portion of the crossing wire is guided by a leading end portion of the retaining projection, wherein the winding start terminal portion of the wound portion is positioned further toward a base end portion of the tooth portion than a crossing start terminal portion of the crossing wire, the retaining projection is present between the winding start terminal portion of the wound portion and the crossing start terminal portion of the crossing wire, wherein the retaining section configures a snap-fit structure that clamps the winding start terminal portion of the wound portion using the retaining projection and the supporting portion, wherein a plurality of mutually independent armature configuration units are configured by assembling a pair of the core configuration members to each of the plurality of insulators, and winding one of the plurality of windings on the tooth portions of the pair of core configuration members, wherein a plurality of armature configuration portions are configured by assembling adjacent armature configuration units from the plurality of armature configuration units together, and wherein, in each of the plurality of armature configuration portions, a pair of crossing wires is disposed so as to track along each of the pairs of the coupling portions, and one of the coupling portions and one of the crossing wires, and another of the coupling portions and another of the crossing wires, are divided at one side and at the other side of the axial center of the armature configuration portions.

* * * * *